(12) United States Patent
Richardson et al.

(10) Patent No.: US 6,493,980 B1
(45) Date of Patent: Dec. 17, 2002

(54) DUCK DECOY WITH QUICK RELEASE, FOLDABLE WINGS

(75) Inventors: Johnny J. Richardson, Little Rock, AR (US); Barton D. Richardson, Alexander, AR (US)

(73) Assignee: American Plastics Inc., Little Rock, AR (US)

(*) Notice: Subject to any disclaimer, the term of this patent is extended or adjusted under 35 U.S.C. 154(b) by 0 days.

(21) Appl. No.: 09/915,498

(22) Filed: Jul. 26, 2001

(51) Int. Cl.[7] .............................................. A01M 31/06
(52) U.S. Cl. ............................................................. 43/3
(58) Field of Search ........................... 43/2, 3; 446/153, 446/156, 158

(56) References Cited

U.S. PATENT DOCUMENTS

| | | | |
|---|---|---|---|
| 2,480,390 A | * | 8/1949 | Thompson ........................ 43/3 |
| 2,545,801 A | | 3/1951 | Wrazen |
| 2,752,715 A | | 7/1956 | Miller |
| 2,909,859 A | | 1/1959 | Christmas |
| 3,059,368 A | | 10/1962 | Wortman |
| 3,768,192 A | * | 10/1973 | Caccamo .......................... 43/3 |
| 4,012,722 A | | 3/1977 | Ferell |
| 4,620,385 A | * | 11/1986 | Carranza et al. ............... 428/16 |
| 4,845,873 A | * | 7/1989 | Hazlett ............................. 43/3 |
| 4,896,448 A | | 1/1990 | Jackson |
| 5,274,942 A | | 1/1994 | Lanius |
| 5,809,683 A | | 9/1998 | Solomon |
| 5,862,619 A | | 1/1999 | Stancil |
| 5,884,427 A | | 3/1999 | Carver |
| 5,930,936 A | | 8/1999 | Parr |
| 5,960,577 A | | 10/1999 | Walterson |
| 6,092,323 A | * | 7/2000 | McBride et al. .................. 43/3 |
| 6,170,188 B1 | * | 1/2001 | Mathews .......................... 43/3 |
| 6,339,894 B1 | * | 1/2002 | Solomon .......................... 43/3 |

* cited by examiner

Primary Examiner—Peter M. Poon
Assistant Examiner—Susan L Piascik
(74) Attorney, Agent, or Firm—Stephen D. Carver

(57) ABSTRACT

A decoy has outwardly projecting wings rotated by a motor secured by modularized mounting system shrouded within a lifelike plastic shell. The mounting mechanism comprises a resilient internal plate comprising integral bosses for connection to the shell. One boss receives a motor mount and a battery clamp respectively securing the internal battery and the motor that dynamically drives the wings. Shoulders defined in the boss and the motor mount are engaged by downwardly projecting lips projecting from the battery clamp and the motor mount, and the motor is retained within a special rectangular orifice. Axle ends projecting from the motor quick-connect with the wings. A special coupling with angled slots quick connects or quick-disconnects the wings and allows folding. A spring on each axle yieldably maintains the wings in place. The wings rotate about their longitudinal axis. The wings stop moving with their bright white bottoms aimed downwardly.

15 Claims, 13 Drawing Sheets

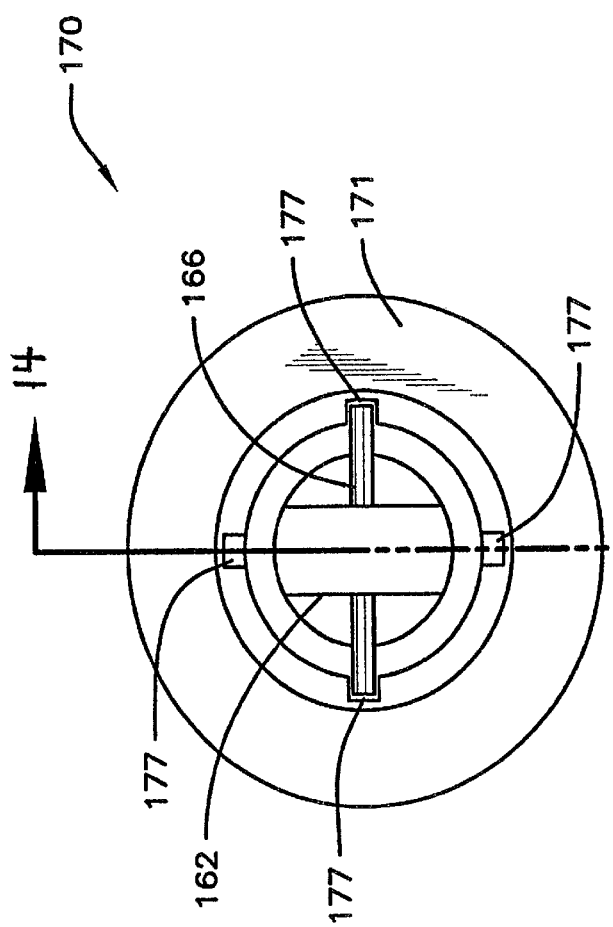
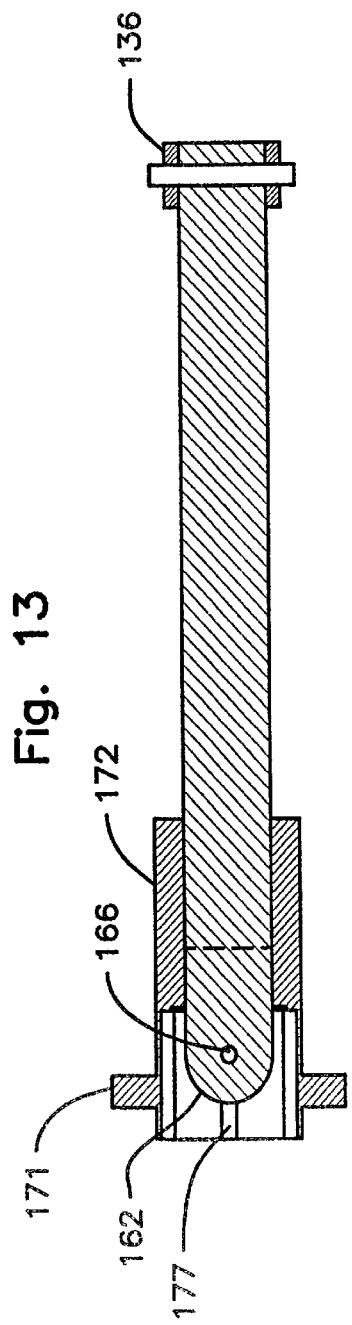
Fig. 13
Fig. 14

DUCK DECOY WITH QUICK RELEASE, FOLDABLE WINGS

BACKGROUND OF THE INVENTION

I. Field of the Invention

The present invention relates generally to moving or motorized decoys for bird hunters. More particularly, our invention relates to battery-powered, duck decoys with movable, foldable wings, of the type classified in United States Patent Class 43, Subclasses 2 and 3.

II. Description of the Prior Art

Skilled bird hunters, particularly duck hunters, have long recognized the desirability of employing decoys for attracting game birds. Duck hunters typically deploy a variety of floating decoys colored like mallards, wood ducks, or other game birds. These may be spaced apart in a relatively large area proximate the blind or boat. Typically, a plurality of separate, spaced-apart, and anchored decoys are arranged in a natural pattern resembling a flock of landed ducks. For the scheme to work, it is important that a natural appearance is established. Hopefully the flying ducks will land proximate the hunters, being attracted by the decoys to an advantageous shooting position. Most decoys are carefully painted to closely resemble the target species. Some prior art decoys are deployed on land and some are anchored within water. Such prior art "static" decoys lack moving appendages.

Relatively more recently, it has been recognized that moving decoys, or decoys with articulate appendages, offer a significant improvement over the common "fixed" or static decoys. By emulating motion, modern dynamic decoys are more likely to attract game birds than older static designs. Real game birds, particularly migratory waterfowl including common mallards, wood ducks and the like, are constantly moving their bodies, flapping their wings and paddling their feet. It has been found that by emulating such motions in modern decoys, ducks are more likely to be attracted towards the hunter.

The advance in battery technology and developments in miniature motor technology has enhanced the opportunity to provide decoys with moving parts and appendages. Some modern decoys comprise battery-powered drive or propulsion systems enabling the decoy to move about in the water, attracting the attention of desirable game birds from afar. Some decoys provide movable wings or movable feet. Sometimes the feet are used for propulsion. Moving appendages can splash the water, and make other game-attractive movements and noises. Normally the battery packs, drive motors, and interconnected linkages are housed neatly within a hollow plastic shell that is ornamentally painted like the target bird.

The overall ornamental appearance of suitable dynamic decoys, as visibly externally to targeted birds, must be as close as possible to the real thing, notwithstanding the presence of internal or external motors propulsion drive systems, wing appendages or linkages and the like. At all times a successful dynamic decoy must make lifelike-movements that attract, rather than repel, the desired game birds. If properly generated, decoy movements can readily attract desired game birds, despite the fact that movements often startle or scare away game. Since movement can be perceived by game animals from a relatively distant location, proper game-emulative movements made by a decoy can attract birds from a distance much further away than mere floating or static decoys.

U.S. Pat. No. 5,636,466 issued to Davis illustrates a goose decoy containing a radio controlled motor to produce motion.

U.S. Pat. No. 4,845,873 describes a duck decoy incorporating an electric motor coupled to wing appendages for producing a flapping motion thereof Various other patents have been granted in the past that incorporate either an electric motor or a string mechanism manipulated by the hunter to produce animation, such as wing and/or head movement.

U.S. Pat. No. 4,128,958 discloses a decoy having movable wings mounted on the side of the body that are manipulated from a remote location. The wings can be moved from a retracted position to an operative position in which the wings are made to move up and down in a flapping motion to simulate the actions of a live bird.

U.S. Pat. No. 2,909,859 discloses a decoy having movable wings which are attached through external linkage activation means within the hull. The decoy is remotely controlled by a squeeze bulb connected to a flexible line leading to the concealed hunter. The wings emulate the normal flapping motion of a live bird.

U.S. Pat. Nos. 4,896,448 and 5,960,577 show alternative wing designs that produce wing movement through diverse linkages.

Solomon in U.S. Pat. No. 5,809,683 discloses a duck decoy with wings projecting in a linear arrangement that is transverse to the longitudinal axis of the duck body. Instead of revolving the wings about an the axis of the strut supporting them, the wings are reciprocated towards and away from one side to the other by converting rotary motion to reciprocating motion.

In contrast to Solomon above, U.S. Pat. No. 2,545,801 issued Mar. 20, 1951 provides a pair of external, rotatable wings attached to a drive axle penetrating the body transversely through the unit's longitudinal axis. The latter drive axle configuration is similar in conception to the decoy seen in U.S. Pat. No. 5,930,936, which drives a pair of submerged feet on opposite sides of the body by an axle oriented transversely with respect to the longitudinal axis of the decoy.

Similarly, U.S. Pat. No. 4,620,385 drives a pair of oppositely disposed rotors or drums that are supposed to emulate natural wings. A transverse axle perpendicular to the major length of the decoy penetrates the body sides and supports the rotors. The "wings" are slidably mounted on the axle and project laterally outwardly away from the body.

U.S. Pat. Nos. 3,059,368 and 5,274,942 disclose decoys with movable heads

U.S. Pat. No. 2,752,715 discloses a decoy combining limited body movement with minor wing movements.

U.S. Pat. No. 4,612,722 discloses a decoy comprising a motor-driven propeller that enables locomotion. It is known to combine this type of decoy propulsion design with remote control radio equipment.

Although the prior art is literally replete with dynamic decoys with designs that are almost too numerous to mention, certain real world considerations pertaining to the effectiveness of modern dynamic decoys remain for consideration and resolution. A suitable decoy must be adequately powered with a suitable battery that provides enough power for several hours of continuous, substantially uninterrupted operation. The battery must be easily exposed for recharging and servicing. As this implies a rather heavyweight battery, a proper mounting means must be provided within the decoy body. The mounting construction must be properly designed to preserve the proper orientation of the bird. The weight distribution of internal parts must not interfere with the decoy's ability to readily easily assume a lifelike orientation when deployed. Further, an adequate decoy must assume a lifelike position and appearance, even when the batteries are dead, or the hunter chooses not to actuate the wings.

Further, modern hunting decoys are usually packaged in a convenient, plastic carrying case. Bulk and weight needs to be minimized. The wings (or other moving appendages) must be capable of folding or detachment so that minimal container volume is achieved. Once the hunter arrives at the blind, the wings should be easily deployed. Once attached to the drive mechanism, they should remain operational during the hunt without necessitating tedious adjustments or drastic field modifications. Additionally, suitable decoys must be designed for quick packaging at the end of the hunt. Since the laws of most states prohibit the hunter from leaving decoys out overnight, the "clean up" procedure must be repeated each evening, often in conditions of near darkness, so simplicity is the goal. In the early morning hours of predawn darkness, when avid duck hunters are deploying their decoys, the cold, low-light and moist conditions do not favor complex, difficult-to-assemble modular designs with poorly fitting parts and inadequately designed hulls or bodies.

It is also to be emphasized that, in order to mass produce decoys with the highly desirable features discussed above, the critical parts must fit together in an orderly and precise fashion. The design must ease the burdens of the assembler. I have found that a truly modular design is desirable, but at the same time, the component parts must be properly balanced and orientated so as to preserve the life-like personae of the decoy. Against that background, typical decoys are inevitably subjected to misuse and diverse stresses in the field, notwithstanding the preferred use of protective plastic carrying cases. Such units must be readily susceptible to field repairs and maintenance.

SUMMARY OF THE INVENTION

Our new decoy invention provides an internal modularized, constructions for an orderly arrangement of the critical parts. These are disposed within the interior of the decoy, and access is easily permitted by the folding body of the decoy that can be quickly pivoted to expose the inner workings. The drive motor operates a pair of outwardly projecting, revolving wings to simulate a natural duck. An attractive, lifelike plastic housing emulates the desired duck.

Each wing is shaped and colored to resemble the target animal. In the best mode, the wings are colored like those of a mallard duck. Means are provided to maintain the lifelike white bottom of the wings in a natural, orientation pointing downwardly when the drive motor is turned off. When the motor runs, the wings are rotated about their longitudinal axis.

We have provided a new "quick-connect" or "quick disconnect" design for the critical wing couplings. Preferably, each wing comprises a uniquely designed terminal fitting that enables it to be quick fitted or quick-disconnected from the motor drive axles, while permitting folding action relative thereto. In other words, the wings may be removed by simply uncoupling them from the drive axles when needed. Alternatively, the wings can remain coupled to the drive axles, and at the same time be gently folded to an approximately ninety degree angle relative to the longitudinal axis of the decoy. This option afforded the hunter facilitates shipping and handling of the decoys, and greatly eases the hunters burdens when deploying one or more decoys near his boat or blind prior to daylight in actual field conditions.

Thus a basic object is to provide a portable, dynamic decoy for bird hunters with movable wings that can be easily deployed in the field A similar important object is to provide a decoy whose wings can be readily and conveniently folded for storage and/or transportation without being completely mechanically disconnected.

Another basic object is to provide a decoy for bird hunting that reliably attracts game birds from a long distance.

A related object is to provide an improved, motor-activated decoy that moves its wings to rapidly attract game birds.

A related object is to provide a decoy that can be simply and easily deployed, and that can be quickly and conveniently transported back to camp after a hunt.

Another basic object is to provide a dynamic decoy of the character described that is readily capable of economically feasible manufacture.

Another object of the present invention to provide rotatable and detachable wings for birds decoys, which neatly fold to an out-of-the way position.

Yet another broad object is to provide a reliable, and dynamic duck hunting decoy.

Still another basic object is to provide a dynamic decoy of the character described that attracts game birds from long distances.

Another object is to provide a decoy of the character described that attracts game birds from long distances.

Another object is to provide quick-connecting wings which are easily folded or deployed, or which can be readily removed by the hunter in the field for repair or replacement.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 13 is an enlarged, fragmentary, sectional view taken generally from a position designated generally by arrow 13 in FIG. 4; and, FIG. 14 is an enlarged, fragmentary, longitudinal sectional view taken generally along line 14—14 of FIG. 13.

DETAILED DESCRIPTION

Figure 1:
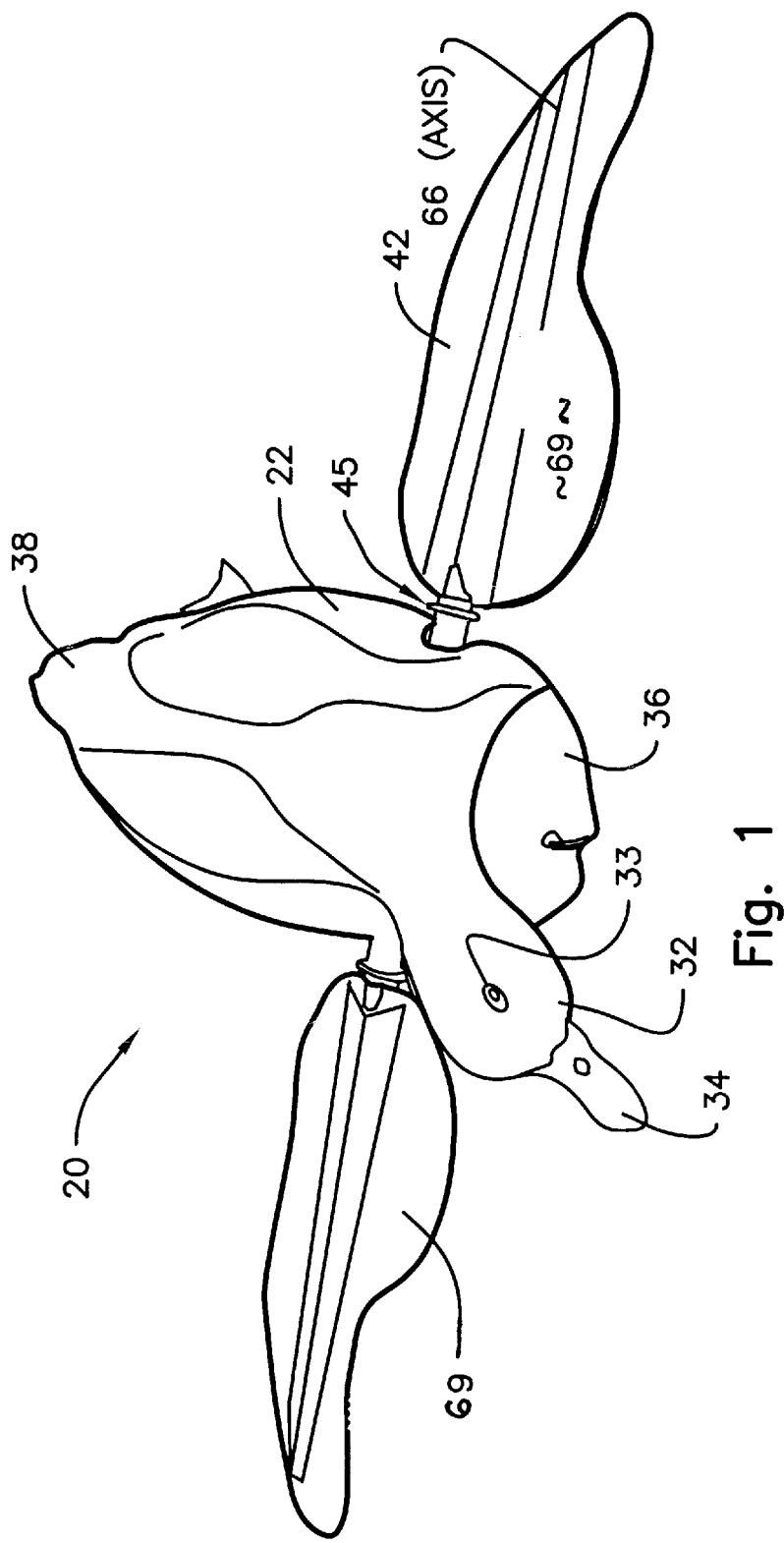
FIG. 1 is a frontal isometric view of our new decoy, with portions thereof omitted for brevity.
Figure 2:
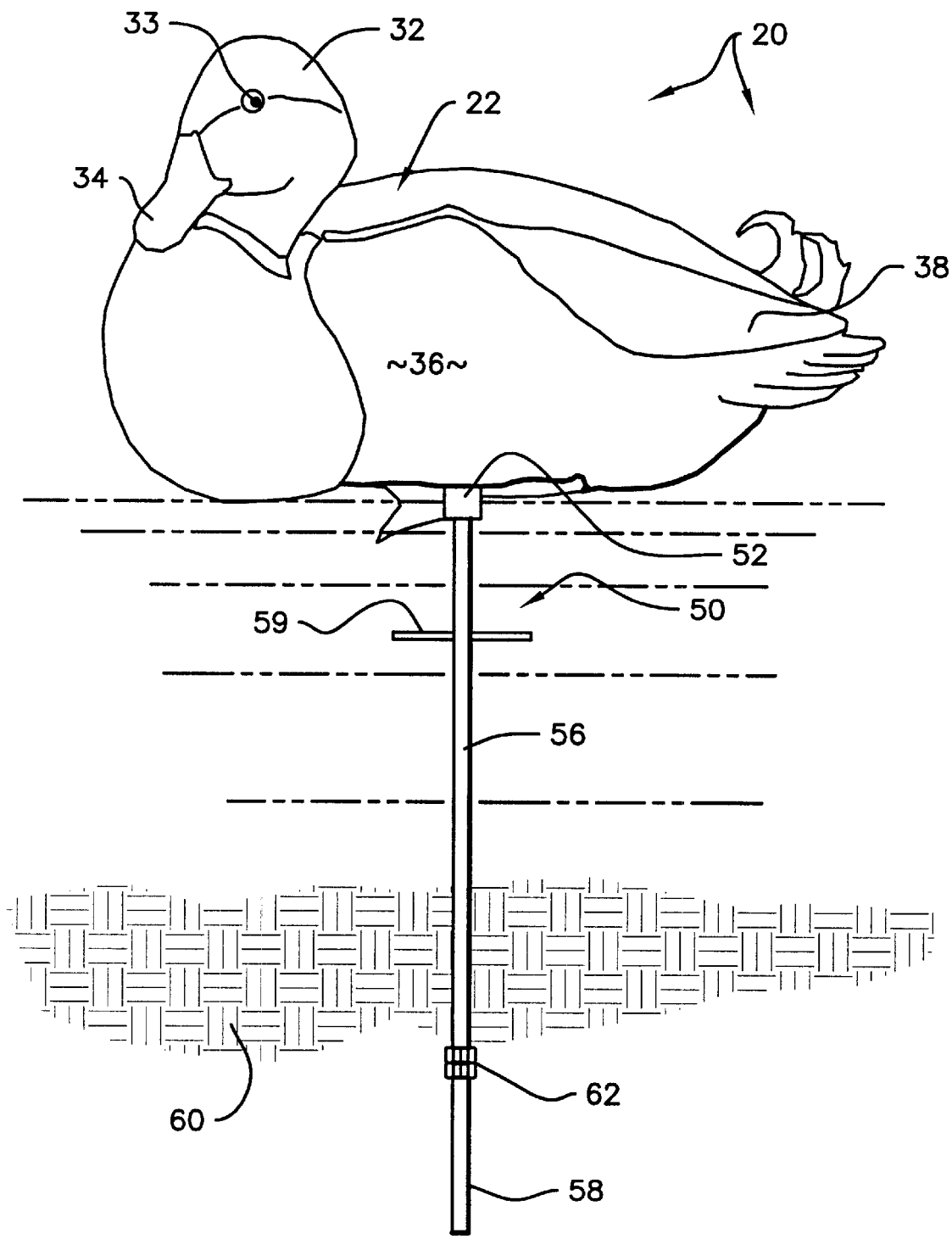
FIG. 2 is fragmentary, pictorial environmental view taken of our new decoy illustrated in use upon an optional pole support system, with the wings omitted for clarity.
Figure 3:
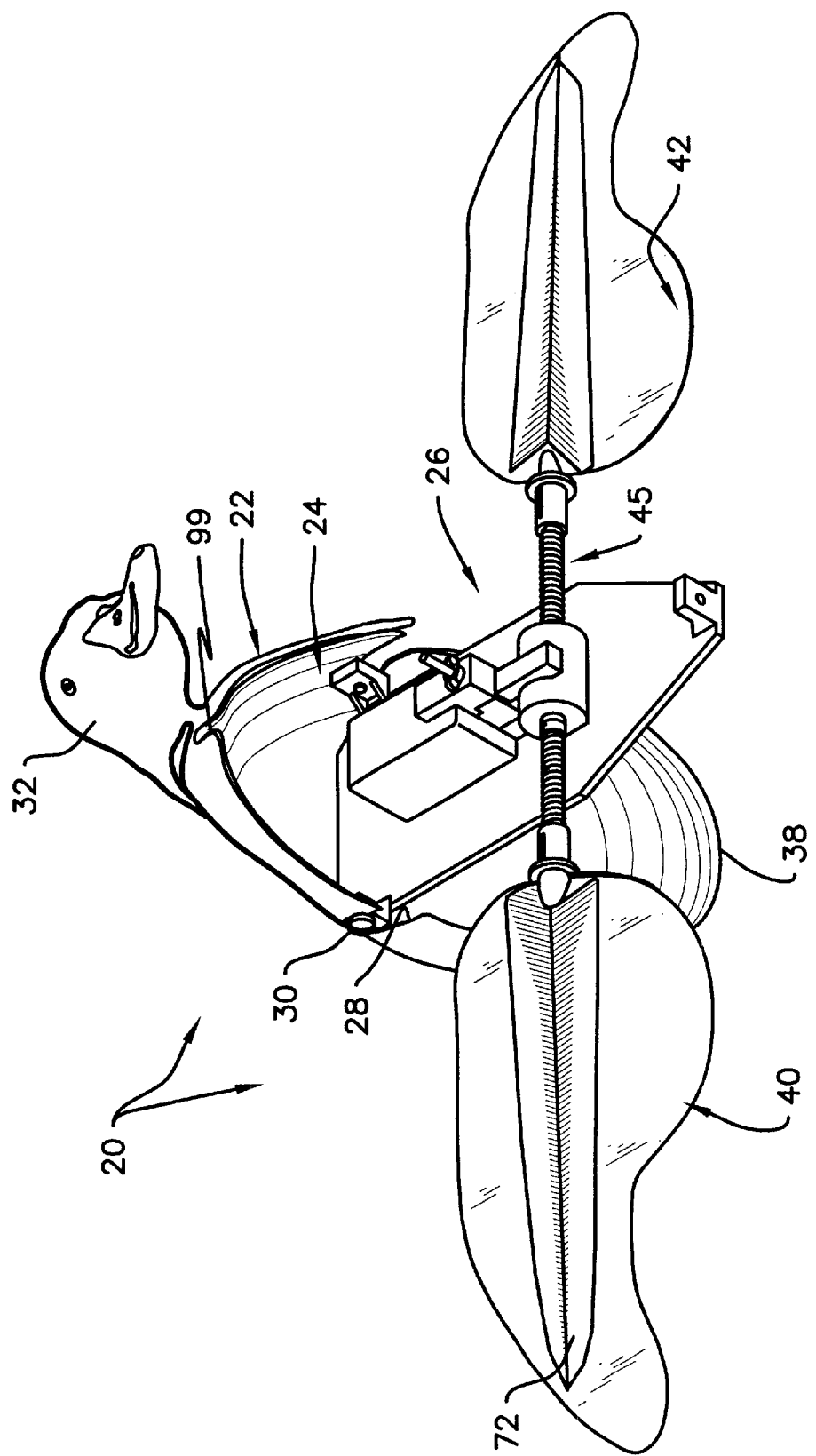
FIG. 3 is an isometric view of the preferred decoy, with the decoy shell rotated away from the modular motor control unit to expose the decoy interior.

Referring initially to FIGS. 1–3 of the appended drawings, our improved, modularized decoy has been generally designated by the reference numeral 20. Decoy 20, which has been constructed in accordance with the best mode of our invention, comprises a life-like, colored plastic shell 22 comprising a hollow interior 24 (FIG. 3) in which a wing control system 26 is preferably disposed. Preferably the decoy shell 22 has a pair of spaced apart, opposed notches 28 defined in its opposite sides enabling the shell 22 to be pivoted to the wing control system 26 with fasteners 30, as will later be explained in detail.

Decoy shell 22 comprises a painted head 32 having eyes 33, a bill 34, a chest portion 36, a rear 38, and a pair of sheet-like plastic feet (not shown). The shell 22 may be painted or decorated in a variety of colorful fashions to emulate the target bird, such as a mallard or wood duck, a goose, etc. The wing control system 26 drives a pair of identical, outwardly projecting wings 40, 42 that are painted or colored to emulate the desired game bird. A rigid driveshaft, generally designated by the reference numeral 45, projecting away from the wing control system 26 (i.e., FIGS. 1–4) drives and engages the rotatable wings 40, 42, as described later.

In use, the decoy 20 may optionally be secured by a support pole system 50 (FIG. 2). A ball-and-socket coupling 52 at the bottom of the decoy receives a vertical shaft 56 that may be pushed into the ground, through the water, until its lower extension 58 is secured within the sand or mud 60. Shaft portions 56 and 58 may be extended or coupled together with a suitable, optional conventional coupling 62 (FIG. 2). An optional, transverse push bar 59 on shaft 56 enables the hunter to quickly push the pole assembly downwardly and firmly into supporting ground or soil. The decoy may be pivoted or rotated about the ball-and-socket coupling 52 to assume a variety of desired positions. Alternatively the decoy 20 may be attached to a suitable stake driven into the ground, or secured to an available support that is convenient for mounting. Importantly, each of the wings is "quick connected" to the control system 26 as will later be described in detail.

As best seen in FIGS. 1 and 3, the wings 40, 42 are shaped substantially identically. Preferred coloration is governed by the type of bird species that is being hunted. Each wing has a longitudinal axis (FIG. 1) designated by the reference numeral 66 that is generally coaxial and coincident with shaft 45. It is preferred that the quick connect coupling system to be described later is coincident with axis 66. In other words, the output drive shaft 45 of the control system 26 (FIGS. 4, 5) is coaxial with the wing axis 66 when the wings are connected. When the motor (described later) is running, the wings rotate about their longitudinal axis. However, when power to the control system 26 is interrupted, and rotation ceases, the wings stop rotating, with their weighted sides 69 (FIG. 1) positioned towards the ground. For decoys resembling mallard ducks, these wing surfaces are normally painted white, corresponding to the bottom of a natural wing. For attracting mallard ducks it is important to generate a visible flash of white when attracting birds. However, when a mallard naturally lands, this white underside will not be visible. In thee best mode, therefore, the wings 40, 42 preferably comprise a weighted portion 72 with a triangular vertical cross section (FIG. 3) that causes them to assume a rest position pointing the white underside downwardly.

Figure 4:
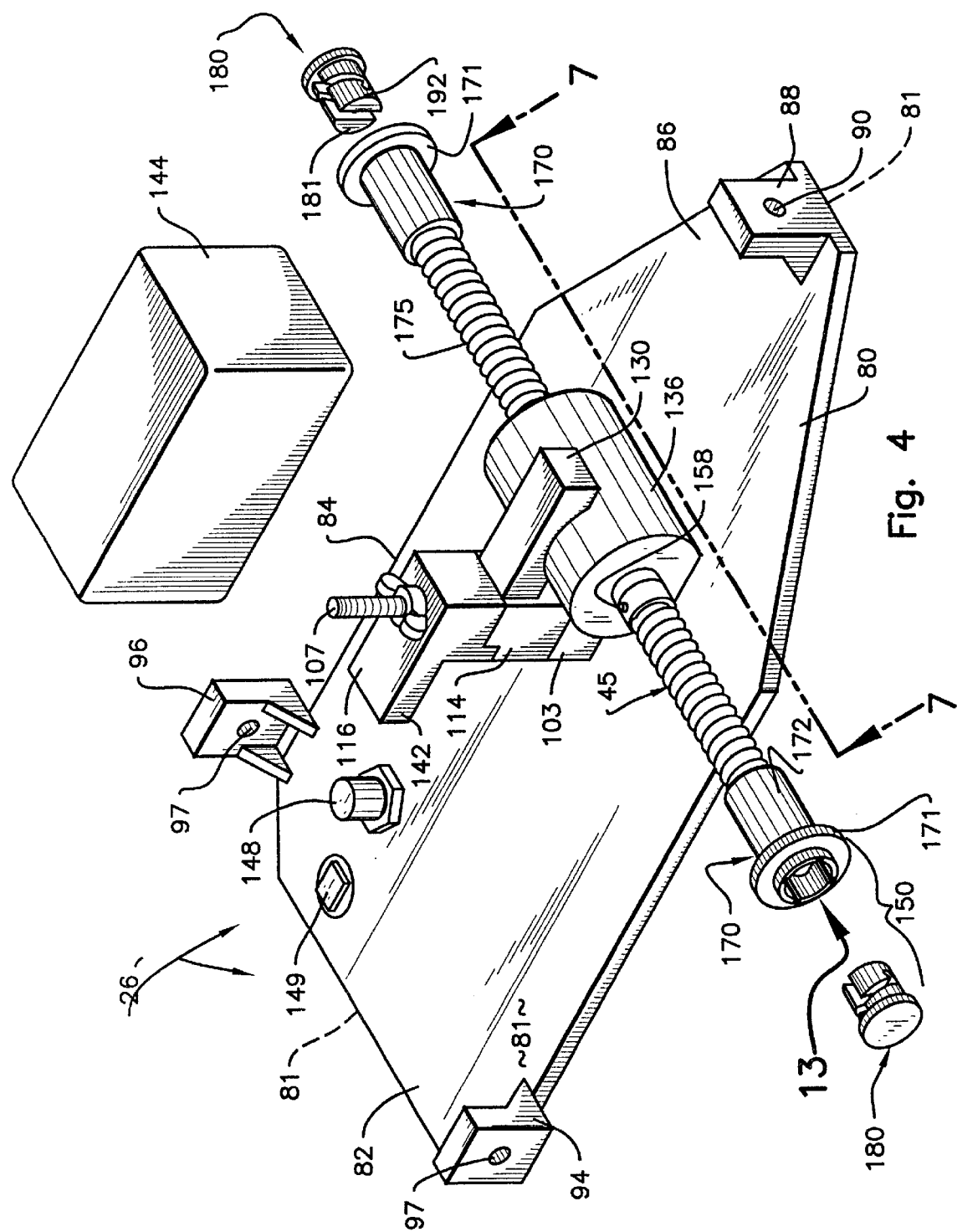
FIG. 4 is an enlarged, partially fragmentary, and partially exploded isometric view of the preferred drive system, with portions thereof omitted for brevity.
Figure 5:
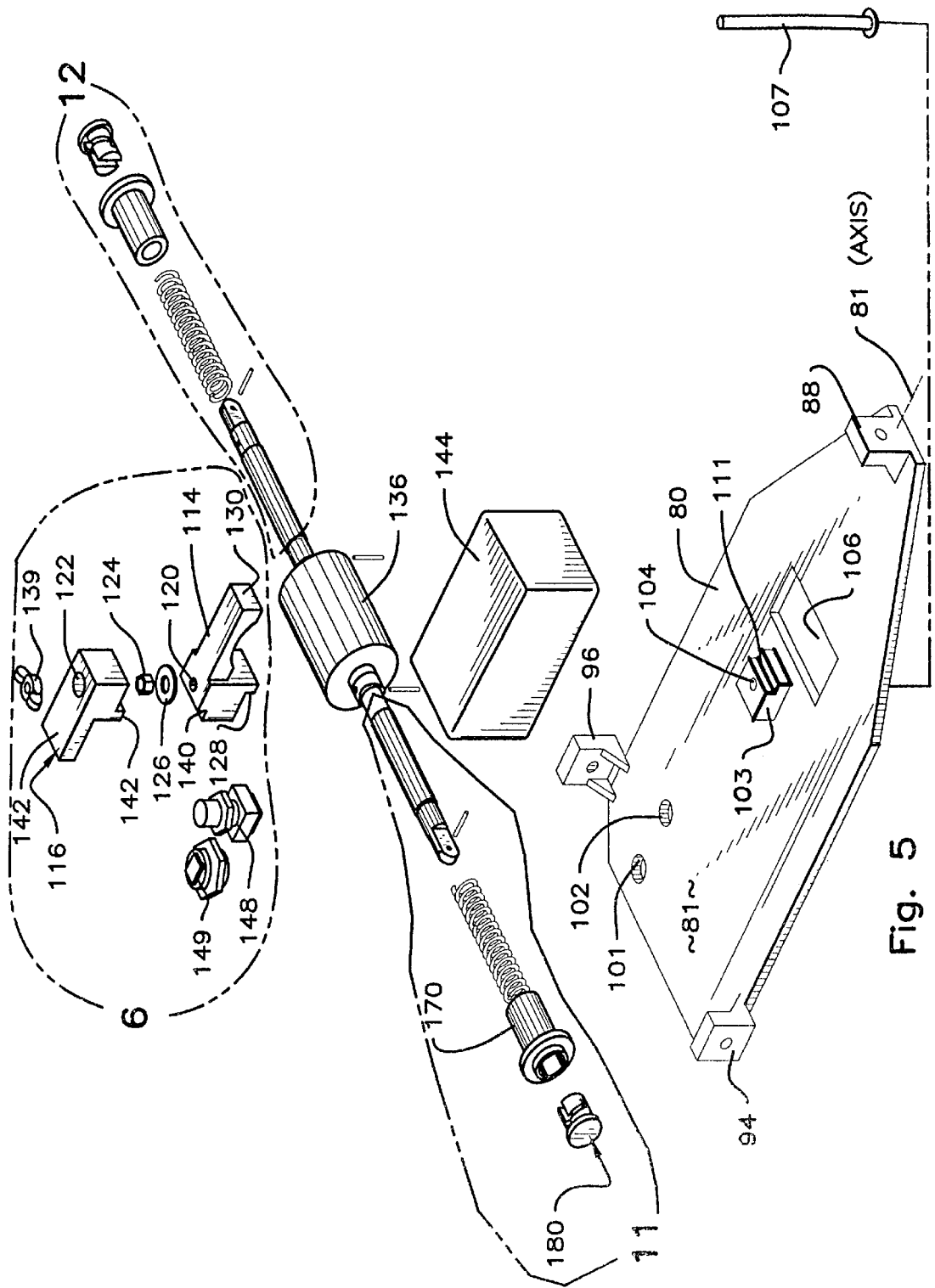
FIG. 5 is an exploded isometric view of the preferred drive assembly.
Figure 6:
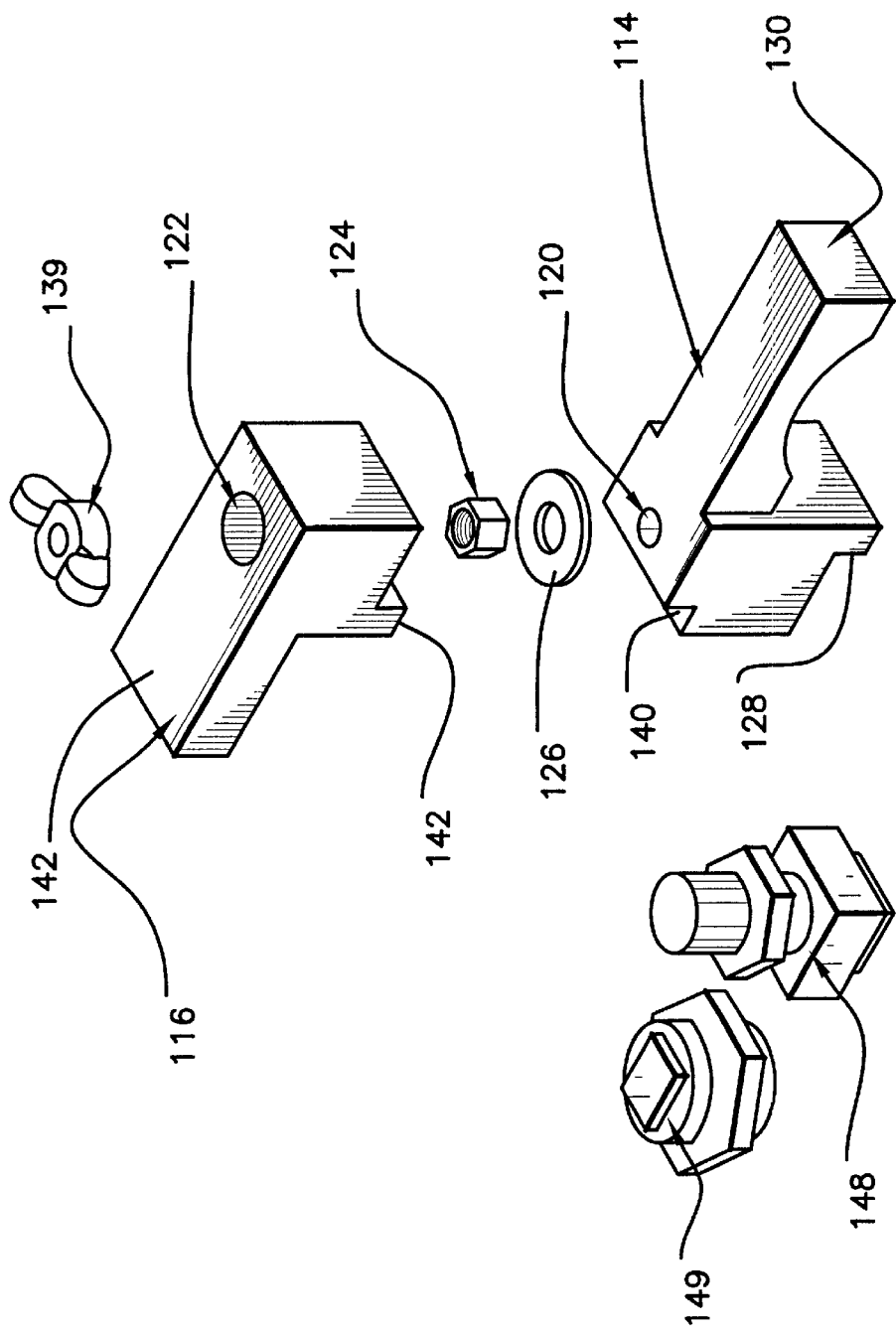
FIG. 6 is an enlarged, exploded isometric view of the preferred motor assembly, derived from circled region 6 in FIG. 5.
Figure 7:
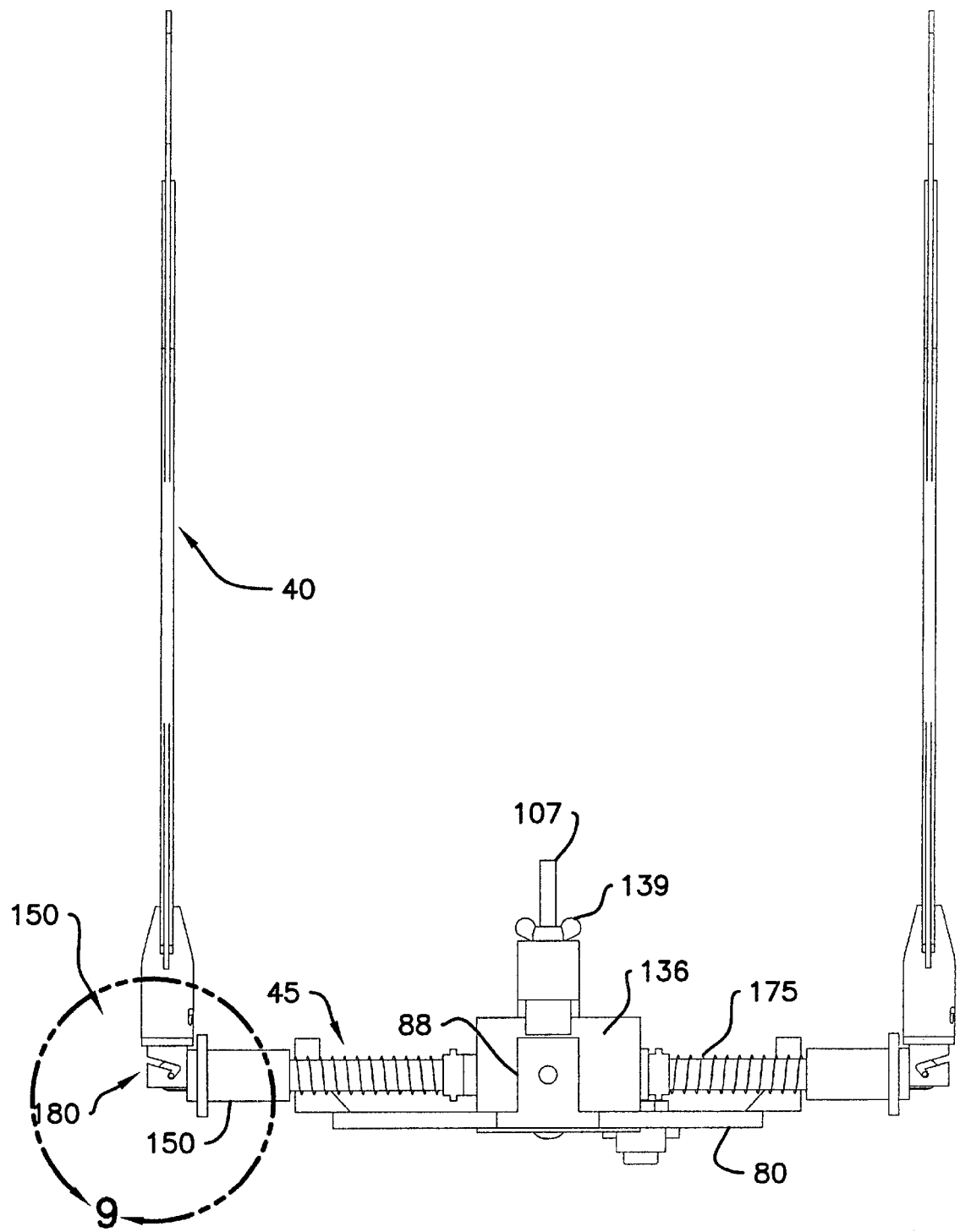
FIG. 7 is an enlarged elevational view of the motor and axle assembly, taken generally along line 7—7 of FIG. 4, but showing the wings connected and folded to alternative storage positions.
Figure 8:
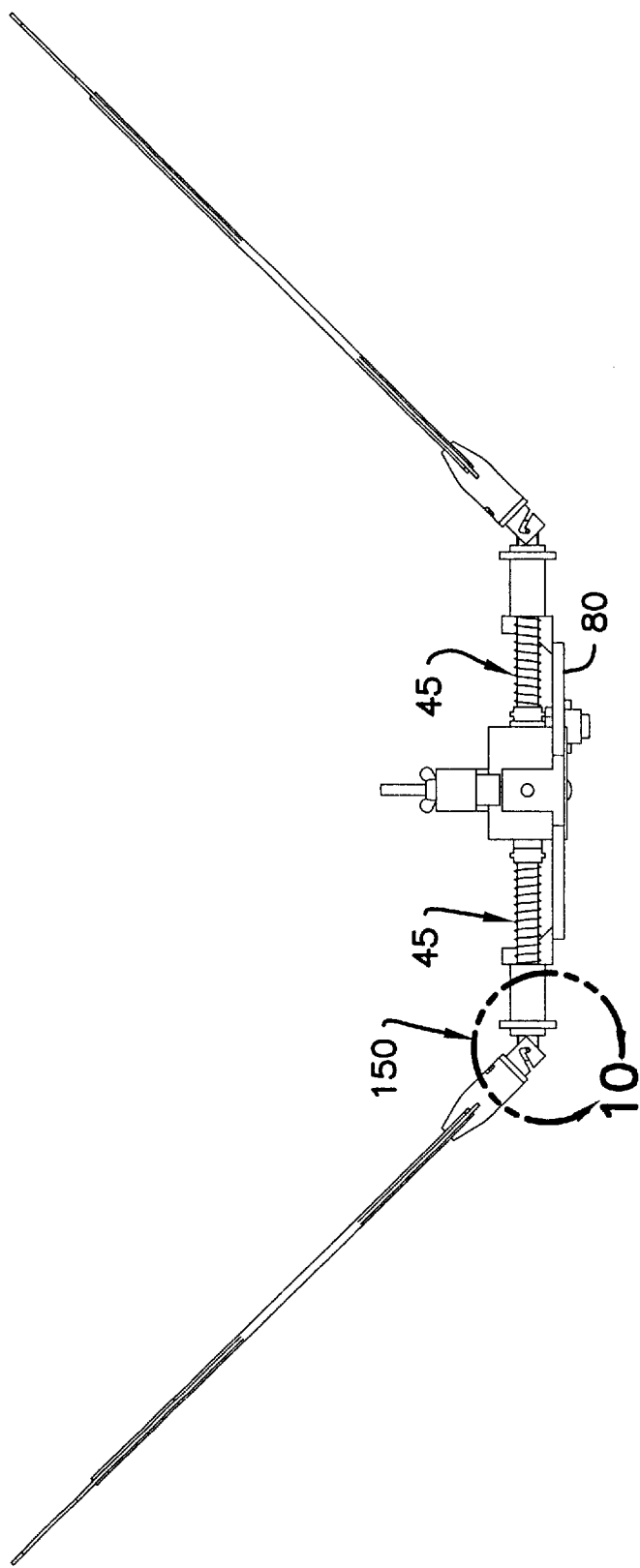
FIG. 8 is a view similar to FIG. 7, but showing the wings folded in an alternative, approximately forty-five degree position.

With primary attention directed now to FIGS. 3–5, the modular wing control system 26 preferably comprises an elongated, generally planar mounting plate 80 that has a longitudinal axis 81 (FIG. 4) normally aligned with and forming the longitudinal axis of the decoy 20. Wing longitudinal axis 66 is preferably perpendicular to decoy longitudinal axis 81

Plate 80 has a rear 82, a pair of spaced apart sides 83, 84, and a generally tapered front 86 terminating in an upturned nose-like boss 88 that aids assembly. An orifice 90 defined in boss 88 aids assembly. A pair of similar, integral bosses 94 and 96 are integrally formed on plate sides 83 and 84 respectively. Bosses 88, 94, and 96 are generally in the form of a parallelepiped, presenting generally-rectangular, outwardly facing mounting surfaces. The orifices 97 defined in bosses 94, 96 receive the fasteners 30 (FIG. 1) described earlier that pivotally mount shell 22. Front boss 88 aligns with a notch 99 (FIG. 3) cut into shell 22 when the decoy is assembled, for threadably receiving a conventional fastener anchored within orifice 90 (FIG. 4).

Resilient plate 80 has an exposed upper surface 81 for mounting the motor and other components. Plate 80 (FIG. 5) has a plurality of circular mounting orifices 101, 102, and a generally rectangular clearance orifice 106. A step-like, generally cubicle, raised boss 103 integral with plate 80 has a mounting orifice 104 aligned with other orifices to be described later for receiving hex-bolt 107. Boss 103 rises from the middle of upper surface 81 of plate 80, and comprises a transverse shoulder 111 facing the front. Shoulder 111 is preferably perpendicular to longitudinal axis 81 (FIG. 4, 5). In assembly boss 103 receives motor mount 114 which in turn mounts battery clamp 116 (FIG. 5). Bolt 107 penetrates boss orifice 104, orifice 120 in motor mount 114, washer 126, bushing 124, and orifice 122 in battery clamp 116. The wing nut 139 threadably mates to the exposed end of bolt 107 and tightly maintains the parts together in compression.

To insure component alignment, motor mount 114 has a downwardly projecting lip 128 that mates against and registers within shoulder 111 in boss 103. Arm 130 projecting from mount 114 (FIG. 5) has a concave underside that bears against the generally cylindrical, miniature DC motor 136 (FIG. 4) in assembly. Arm 130 properly urges against motor 136, which seats within the recess provide by orifice 106. In other words, motor 136 is aligned within the rectangular orifice 106, with portions bearing against plate 80, being aligned substantially perpendicularly with respect to the longitudinal axis 81. The preferred motor 136 is a conventional DC unit, operating at six volts.

To further insure component alignment, a transverse upper shoulder 140 is formed in the upper rear portion of motor mount 114 (FIG. 5). In assembly it is engaged by a downwardly projecting lip 142 formed beneath battery clamp 116. Lip 142 registers within shoulder 140 in assembly. A reduced-width arm 142 integrally projects from battery clamp 116. In assembly it abuts the generally cubicle, preferably six-volt battery 144 sitting atop plate 80. Wing nut 139 maintains the part together in compression, and even if it becomes loose, the parts tend to stay aligned, as the motor is cradled within a recess at a proper orientation, and lip-to-shoulder arrangements discussed earlier promote component alignment. DC electrical current is outputted from conventional battery terminals in the usual fashion, being controlled by a switch 148, mounted through orifice 102 (FIG. 5).

With primary attention directed now to FIG. 4–12, the output shaft of the motor 136 comprises an identical half portion projecting towards and controlling each wing 40, 42. The wing-to-driveshaft coupling system had been generally designated by reference numeral 150 (FIG. 4). This coupling system is associated with each end of the motor, so only one half need be described in detail.

Figure 11:
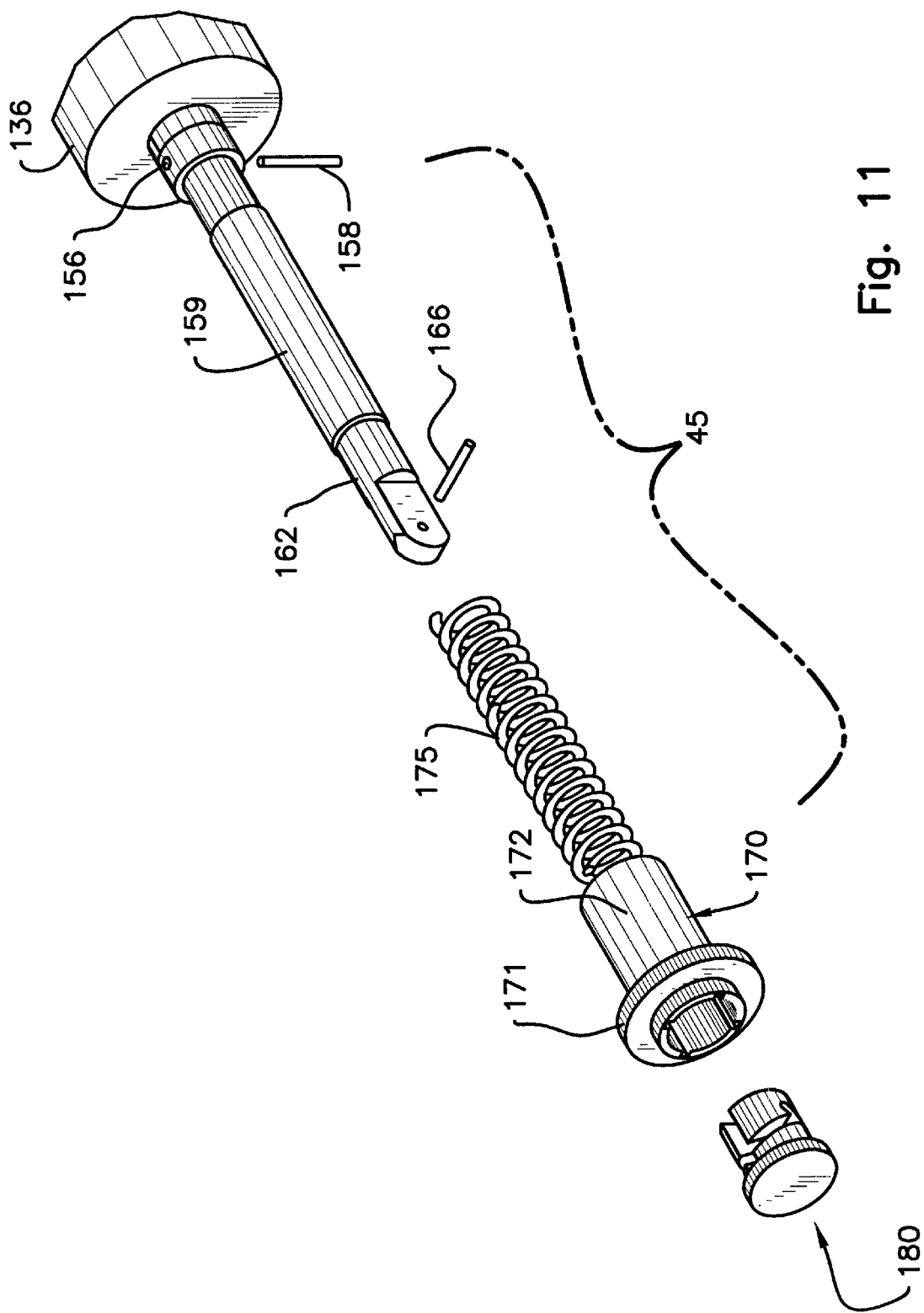
FIG. 11 is an enlarged, fragmentary isometric view of circled region 11 seen in FIG. 5.

Emanating from each end of the motor 136 is a tubular collar 156 (FIG. 11) that is coaxially fitted to rigid shaft 159, being fastened by pin 158. Shaft 159 terminates in a forward tongue 162 that receives a locking pin 166 that transversely extends through it. A barrel-like coupling 170 coaxially fitted to the shaft 159 moves axially relative to the shaft and is yieldably deflectable by one's fingers. It is axially retained by pin 166 (FIG. 11). Coupling 170 comprises a flange 171, and an integral tubular body 172. A spring 175 (FIGS. 4, 11) coaxially projecting rearwardly from coupling body 172 is received about shaft 159 to normally urge coupling 170 outwardly, within limits established by pin 166 (FIGS. 4, 5, 11). When coupling 170 is manipulated by the user, it may be pushed back against predetermined tension from spring 175, exposing tongue 162 and the locking pin 166 captivated within it. The barrel 172 of coupling 170 has alternate, radially spaced apart guide slots 177 (FIGS. 4, 13) internally defined within it, in which pin 166 tracks when the parts are assembled.

Figure 9:
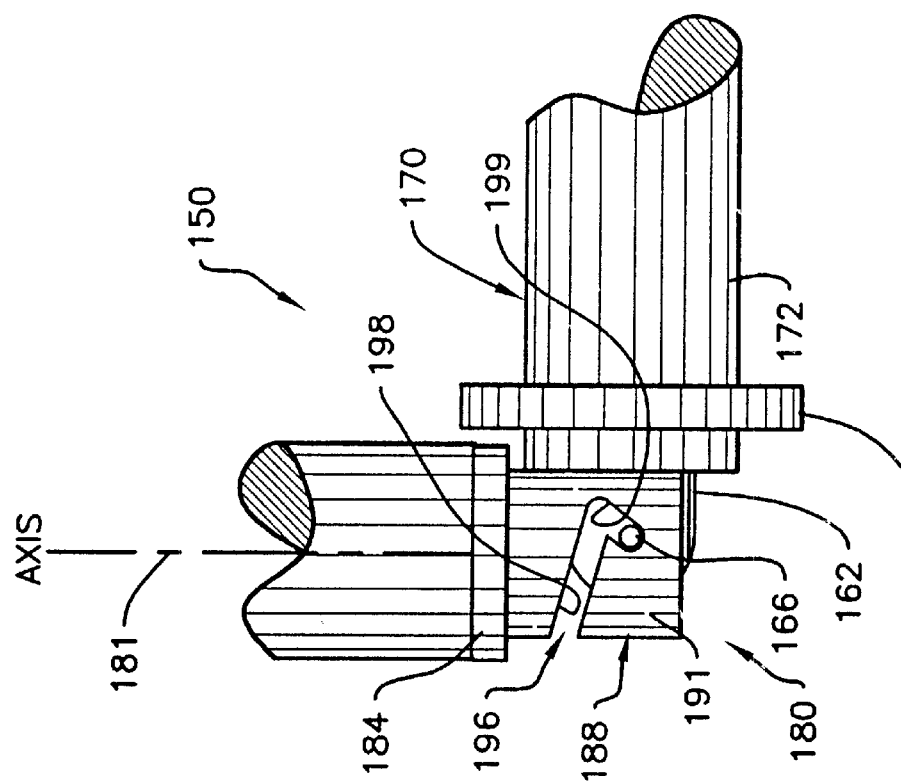
FIG. 9 is an enlarged, fragmentary isometric view of circled region 9 seen in FIG. 7, showing the preferred wing coupling system.
Figure 10:
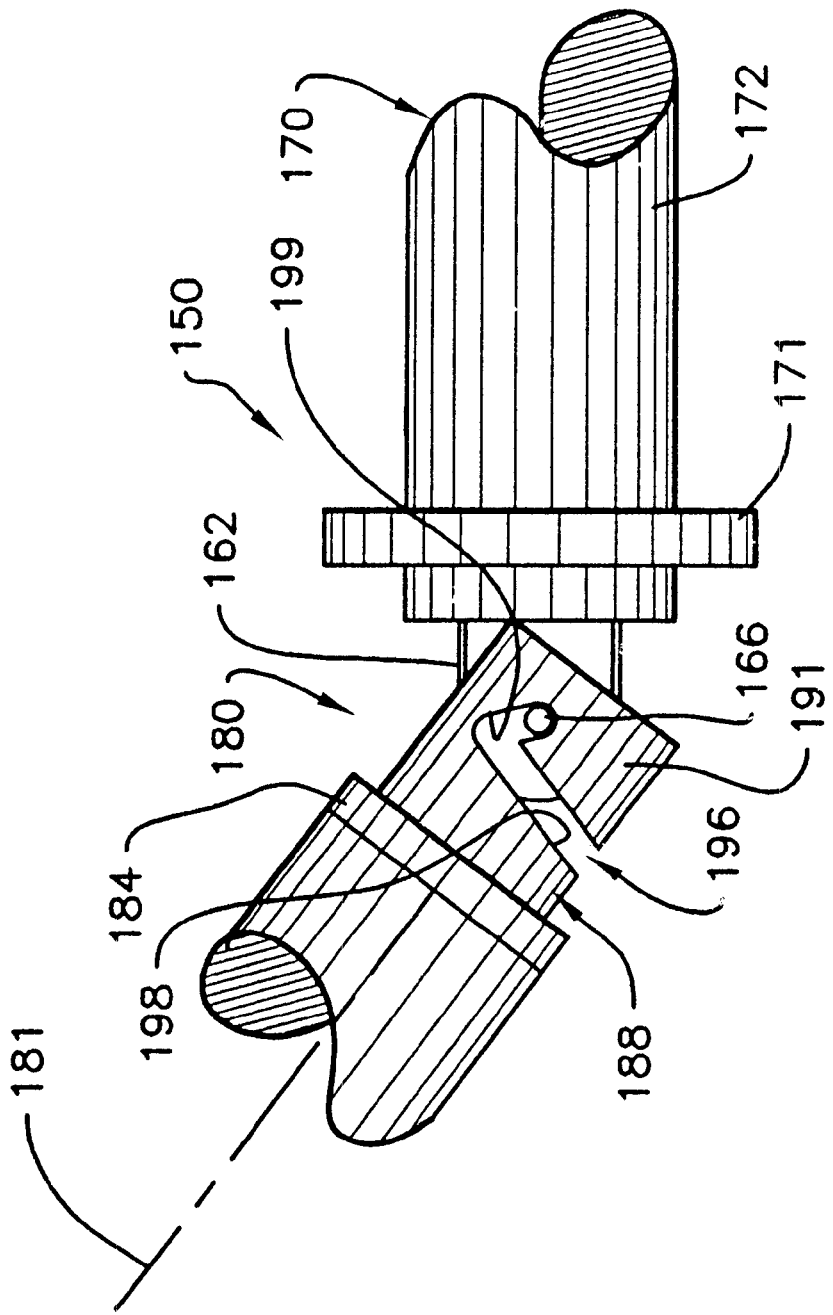
FIG. 10 is an enlarged, fragmentary isometric view of circled region 10 seen in FIG. 8, showing the preferred wing coupling system.
Figure 12:
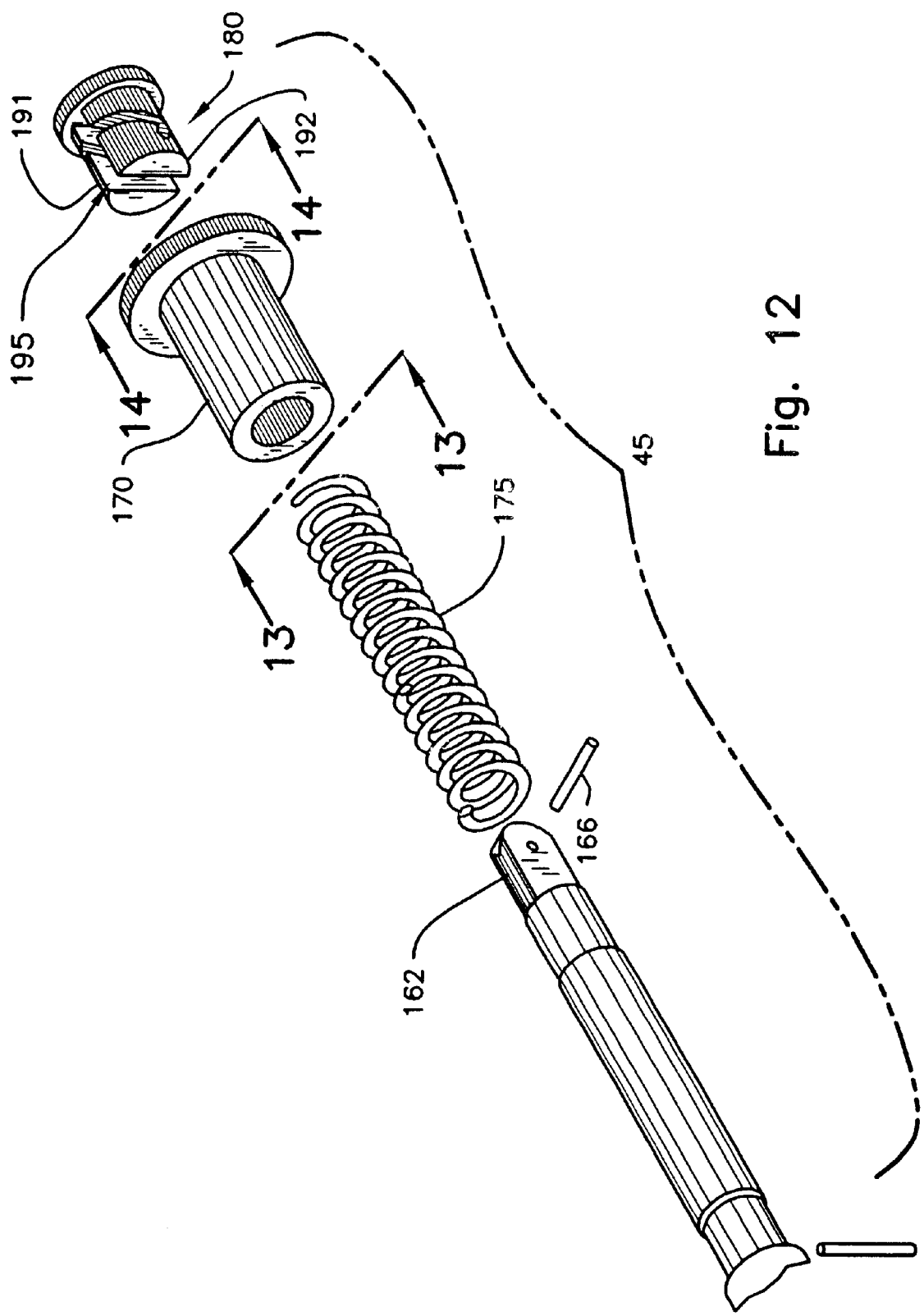
FIG. 12 is an enlarged, fragmentary isometric view of circled region 12 seen in FIG. 5.

Each wing terminates in a companion fitting 180 (FIGS. 8–10, 12) comprising a terminal flange 184 and a companion barrel 188 (FIGS. 9, 10), together sharing longitudinal axis 181 (FIG. 9). Importantly, as best seen in FIG. 12 , barrel 188 is split into two generally semi-cylindrical halves 191, 192, separated by an elongated channel 195 which is in the form of a parallelepiped. The channel 195 (FIG. 12) admits tongue 162 and transverse locking pin 166 (FIG. 12) during assembly. Each barrel half 191, 192 has a special two piece slot 196 (FIGS. 9,10) formed in it, that is in physical communication with slot 195 between the barrel halves. Special arcuate slot 196 comprises a first angled portion 198 (FIGS. 9, 10), that is neither parallel with nor perpendicular to fitting axis 181 (FIG. 9). Slot 198 intersects another angled slot portion 199 (FIGS. 9, 10) that is neither parallel with nor perpendicular to fitting longitudinal axis 181. When assembled, as seen in FIGS. 9, 10, the tongue locking pin 166 will rest in the end of slot 199 when properly fitted with tongue, 162 sandwiched within slot 195 (FIG. 12).

To couple a detached wing to the motor axles, coupling 170 (FIG. 12) may be manually grasped, and pushed rearwardly against pressure from spring 175. This exposes tongue 162 and pin 166, and the tongue can now be thrust into the barrel 188 of fitting 180. At the time pin 166 rides within the slot 195 between the semi-cylindrical halves of the barrel, and the linear motion involving only pushing or pulling commences until pin 166 reaches the entrance point of slot 196 (FIGS. 9, 10). Thereafter a slight twisting action is applied. This twisting torsionally displaces the tongue and the pin 166, and pin 166 may be positioned for subsequently traveling within slot 196. Pin 196 will first travel through slot portion 198 until an appropriate reverse twist places it within slot portion 199 (FIG. 9) thus captivating it. Then the operator can simply release the coupling and the wing remains attached. The wings can be oriented to point straight out in normal operation (FIG. 3), or they can assume a ninety degree bend as in FIG. 9 for storage or transportation. They can assume intermediate angular positions as well (FIG. 10), wherein axis 181 is illustrated angled at about forty five degrees removed from the text, with corresponding corrections, where necessary, proposed to the drawings.

It will be noted that the wings remain attached as long as the tongue pin 166 is captivated within slot 199. This condition is insured even though the wing fitting 180 is rotated relative to coupling 170 in a plane of rotation that is generally coincident r parallel with tongue 162, coupling 170 and the motor drive axle. As the folding continues from the position of FIG. 9 to that of FIG. 10, and thereafter to the straight "deployed" or operational position of FIG. 1 tongue tension will varied and controlled by the spring 175. In moving between the position of FIG. 10 and the straight operational position, fitting 180 goes "overcenter" relative to coupling 170 as rotation about pin 166 continues, and the flat barrel ends find themselves flushly together, as opposed to the unstable intermediate position of FIG. 10 where on the corner of fitting 180 touches the coupling 170.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A modularized hunting decoy comprising:
   a shell decorated like a target animal, the shell comprising an interior;
   a longitudinal axis;
   a pair of rotational moving wings extending outwardly from the decoy substantially perpendicularly from the longitudinal axis;
   a modular wing control system for moving the wings, the wing control system comprising a motor with a transverse driveshaft having outwardly extending axle portions on each side of the decoy, a battery for powering the motor, an elongated, generally planar mounting plate disposed within said interior, a recess for receiving the motor, a step-like, generally cubicle, raised boss comprising a transverse upper shoulder perpendicular to said longitudinal axis, and a motor mount coupled to said boss or securing said motor within said recess, the motor mount comprising a downwardly projecting lip to register within said boss shoulder to preserve alignment, and a projecting arm bearing against the motor;
   quick connect means for releasably connecting the wings to an axle portion such that after they are axially connected and aligned coaxially with the axle portions they may thereafter be folded in a rotational plane that is substantially coplanar with the plane of said axle portions to selectively move them between a storage position and a deployed position.

2. The decoy as defined in claim 1 wherein the motor mount comprises a transverse upper shoulder and the modular control system further comprises a battery clamp adapted to be coupled to the motor mount, the battery clamp comprising a downwardly projecting lip that registers within said motor mount upper shoulder to preserve alignment, and an arm projecting towards the battery to clamp it down.

3. The decoy as defined in claim 1 wherein said quick connect means comprises a wing-to-driveshaft coupling system comprising:
- a forward tongue on each axle;
- a spring captivated on each axle;
- a barrel-like coupling coaxially secured to each axle and biased outwardly by said spring, the coupling having a longitudinal axis;
- a locking pin transversely penetrating said tongue;
- a companion fitting on each wing adapted to be releasably mated to said barrel-like coupling, the fitting comprising a longitudinal axis and pair of semi-cylindrical halves separated by an elongate channel in the form of a parallelepiped, the channel admitting the tongue locking pin, and each half comprising an arcuate slot comprising a first angled portion that is neither parallel with nor perpendicular to the fitting axis and a second angled slot portion that intersects the first angled slot portion and is neither parallel with nor perpendicular to the fitting axis.

4. The decoy as defined in claim 3 wherein the modular control system comprises:
- an elongated, generally planar mounting plate disposed within said interior;
- a recess for receiving the motor; and, means for maintaining the motor in said recess.

5. The decoy as defined in claim 4 wherein tile modular control system further comprises:
- a step-like, generally cubicle, raised boss comprising a transverse upper shoulder perpendicular to said longitudinal axis; and,
- a motor mount adapted to be coupled to said boss for securing said motor within said recess, the motor mount comprising a downwardly projecting lip to register within said boss shoulder to preserve alignment, and a projecting arm bearing against the motor.

6. The decoy as defined in claim 5 wherein the motor mount comprises a transverse upper shoulder and the modular control system further comprises a battery clamp adapted to be coupled to the motor mount, the battery clamp comprising a downwardly projecting lip that registers within said motor mount upper shoulder to preserve alignment, and an arm projecting towards the battery to clamp it down.

7. The decoy as defined in claim 6 wherein the modular control system comprises:
- an elongated, generally planar mounting plate disposed within said interior;
- a recess for receiving the motor;
- means for maintaining the motor in said recess;
- a step-like, generally cubicle, raised boss comprising a transverse upper shoulder perpendicular to said longitudinal axis;
- a motor mount adapted to be coupled to said boss for securing said motor within said recess, the motor mount comprising a downwardly projecting lip to register within said boss shoulder to preserve alignment, a projecting arm bearing against the motor; and upper shoulder; and,
- a battery clamp coupled to the motor mount and comprising a downwardly projecting lip that registers within said motor mount upper shoulder to preserve alignment, and an arm projecting towards the battery to clamp it down against said mounting plate.

8. A modularized hunting decoy comprising:
- a decorative shell formed and colored and shaped like a target bird, the shell defining an interior;
- a longitudinal axis;
- a pair of rotational wings extending outwardly from the decoy substantially perpendicularly from the longitudinal axis;
- a modular wing control system for moving the wings, the wing control system comprising:
    - an elongated, generally planar mounting plate disposed within said interior;
    - means for pivotally connecting the shell to the plate;
    - a motor with a transverse driveshaft having outwardly extending axle portions on each side of the decoy;
    - a battery for powering the motor;
    - a step-like, generally cubicle, boss comprising a transverse upper shoulder perpendicular to said longitudinal axis;
    - a motor mount adapted to be coupled to said boss for securing said motor, the motor mount comprising an upper shoulder, a downwardly projecting lip to register within said boss upper shoulder to preserve alignment, an upper shoulder, and a projecting arm for securing the motor;
    - a battery clamp adapted to be coupled to the motor mount, the battery clamp comprising a downwardly projecting lip that registers within said motor mount upper shoulder to preserve alignment, and an arm projecting towards the battery to secure it; and,
- quick connect means for releasably connecting the wings to an axle portion such that after they are connected, they may thereafter be rotated by said motor.

9. The decoy as defined in claim 8 wherein the mounting plate comprises a rectangular recess in which the motor is nested for preserving component alignment.

10. The decoy as defined in claim 8 wherein said motor oppositely extending drive axles, each comprise:
- a forward tongue;
- a spring captivated on each axle;
- a barrel-like coupling coaxially secured to each axle and biased outwardly by said spring, the coupling having a longitudinal axis;
- means for retaining the coupling; and,
- a locking pin transversely penetrating said tongue.

11. The decoy as defined in claim 10 wherein wing has a companion fitting adapted to be releasably mated to said barrel-like coupling, the fitting comprising a longitudinal axis and pair of semi-cylindrical halves separated by an elongate channel in the form of a parallelepiped, the channel admitting the tongue locking pin, and each half comprising an arcuate slot comprising a first angled portion that is neither parallel with nor perpendicular to the fitting axis and a second angled slot portion that intersects the first angled slot portion and is neither parallel with nor perpendicular to the fitting axis.

12. The decoy as defined in claim 11 wherein the mounting plate comprises a rectangular recess in which the motor is nested for preserving component alignment.

13. A duck hunting decoy comprising:
a decorative shell formed and colored and shaped like a target duck, the shell defining an interior;
a longitudinal axis;
a pair of rotational wings extending outwardly from the decoy substantially perpendicularly from the longitudinal axis;
a modular wing control system for moving the wings, the wing control system comprising:
   an elongated, generally planar mounting plate disposed within said interior, the plate comprising boss means for securing the shell;
   a motor with a transverse driveshaft having outwardly extending axle portions on each side of the decoy;
   a battery for powering the motor;
   a boss comprising a transverse upper shoulder perpendicular to said longitudinal axis;
   a motor mount adapted to be coupled to said boss for securing said motor;
   a battery clamp for securing the battery; and,
quick connect means for releasably connecting the wings so that after they are connected, they may thereafter be rotated by said motor, the quick connect means comprising:
   a forward tongue associated with each axle;
   a spring captivated on each axle;
   a barrel-like coupling coaxially secured to each axle and biased outwardly by said spring, the coupling having a longitudinal axis,
   a locking pin transversely penetrating said tongue; and,
   a companion fitting adapted to be releasably mated to said barrel-like coupling, the fitting comprising a longitudinal axis and pair of semi-cylindrical halves separated by an elongate channel in the form of a parallelepiped, the channel admitting the tongue locking pin.

14. The decoy as defined in claim 13 wherein the fitting halves each comprise an arcuate slot comprising a first angled portion that is neither parallel with nor perpendicular to the fitting axis and a second angled slot portion that intersects the first angled slot portion and is neither parallel with nor perpendicular to the fitting axis for admitting the locking pin to permit subsequent wing folding.

15. The decoy as defined in claim 13 wherein the mounting plate comprises a rectangular recess in which the motor is nested for preserving component alignment.

\* \* \* \* \*